United States Patent
Legall et al.

(10) Patent No.: US 7,412,835 B2
(45) Date of Patent: Aug. 19, 2008

(54) APPARATUS AND METHOD FOR CONTROLLING A CRYOCOOLER BY ADJUSTING COOLER GAS FLOW OSCILLATING FREQUENCY

(76) Inventors: Edwin L. Legall, W154N6245 Marvel Dr., Menomonee Falls, WI (US) 53051; Longzhi Jiang, 2814 Constitution Dr., Florence, SC (US) 29501; Roy A. Mangano, 2807 Alberti Dr., Florence, SC (US) 29501; Mark Derakhshan, 18715 Surrey La., Brookfield, WI (US) 53045

( * ) Notice: Subject to any disclaimer, the term of this patent is extended or adjusted under 35 U.S.C. 154(b) by 424 days.

(21) Appl. No.: 11/167,850

(22) Filed: Jun. 27, 2005

(65) Prior Publication Data

US 2006/0288710 A1 Dec. 28, 2006

(51) Int. Cl.
*F25D 9/00* (2006.01)
*F25B 1/00* (2006.01)
*F25B 49/00* (2006.01)

(52) U.S. Cl. .......................... 62/6; 62/228.1
(58) Field of Classification Search .......... 62/6, 62/228.1
See application file for complete search history.

(56) References Cited

U.S. PATENT DOCUMENTS

| | | | | |
|---|---|---|---|---|
| 3,788,088 A * | 1/1974 | Dehne | | 62/6 |
| 4,543,794 A * | 10/1985 | Matsutani et al. | | 62/47.1 |
| 5,150,578 A * | 9/1992 | Oota et al. | | 62/47.1 |
| 5,398,512 A * | 3/1995 | Inaguchi et al. | | 62/6 |
| 5,535,593 A * | 7/1996 | Wu et al. | | 62/6 |
| 5,936,499 A * | 8/1999 | Eckels | | 335/216 |
| 6,446,444 B1 * | 9/2002 | Chase et al. | | 62/6 |
| 6,938,426 B1 * | 9/2005 | Acharya et al. | | 62/6 |
| 7,257,949 B2 * | 8/2007 | Shimizu et al. | | 60/517 |
| 2003/0019224 A1 * | 1/2003 | Vander Woude et al. | | 62/186 |

FOREIGN PATENT DOCUMENTS

EP 0 684 382 A1 11/1995
JP 2005003314 A 1/2005

* cited by examiner

*Primary Examiner*—William C Doerrler
(74) *Attorney, Agent, or Firm*—Jean Tibbetts; Michael G. Smith; Ellis B. Ramirez (57) ABSTRACT

Systems and methods are provided for a variable cooling capacity cryocooler for a superconducting magnetic resonance imaging device having a liquid cryogen pressure vessel to provide cryogenic temperatures to a magnet assembly, a vacuum vessel surrounding the pressure vessel and a radiation shield spaced from the cryogen pressure vessel, and a pressure sensor positioned inside the cryogen pressure vessel pressure boundary for sensing pressure variations. A controller for varying the heat removal rate of the cryocooler based on the pressure variations in the cryogen pressure vessel and where the cooling capacity of the cryocooler is adjusted by modifying the speed of the electric power drive (DC or AC motors) or by changing the mechanical transmission ratio between the constant speed electric power drive and the cryocooler displacer/piston to adjust the cooler oscillating frequency of the gas flow. The invention can be adapted to magnets or non magnets systems using Stirling, Gifford-McMahon ("GM") and Pulse Tube ("PT") cooler systems. The system will extend component end of life and provide a controllable constant pressure improving image quality for superconducting MRI magnets.

23 Claims, 6 Drawing Sheets

APPARATUS AND METHOD FOR CONTROLLING A CRYOCOOLER BY ADJUSTING COOLER GAS FLOW OSCILLATING FREQUENCY

FIELD OF THE INVENTION

This invention relates generally to a controller adapted to be used in a Stirling, Gifford-McMahon ("GM") and Pulse Tube ("PT") cooler systems, and more particularly to a controller for controlling the cooler oscillating frequency of the gas flow (thru cooler piston/displacer stroke frequency for Stirling and "GM"), applied to a zero boil-off superconducting magnet assembly.

BACKGROUND OF THE INVENTION

In conventional systems, a superconducting magnet becomes superconductive when placed in an extremely cold environment, such as by enclosing the magnet in a cryostat or pressure vessel and surrounding the magnet with a liquid cryogen such as liquid helium for cooling.

The zero boil-off 4.2K magnet cooling system briefly consists of vacuum insulated liquid helium reservoir integrated into a cryostat with a radiation shield with temperature having a range of 40K to 70K and a liquid helium recondencing system in which saturated helium gas is recondenced into liquid causing the reservoir to be at saturated operational condition around 4.2K. The helium reservoir is subjected to a heat load caused by a combination of heat conducted through the structural supports and radiation from its surroundings. Recondencing systems must be able to overcome the applied heat load in order to achieve saturated equilibrium conditions. The main component of the recondencing system is the cryocooler, which is the heat sink or the heat removal source of this system thru a heat exchanger in thermal contact with the cryogen. The current helium zero boil off system is based on a cryocooler design with an excess of cooling capacity to overcome variable heat load condition due to component manufacturing process variations, performance degradation due to component orientation and to be able to satisfy heat loads requirement at the end of the component life.

The conventional cryocooler during normal steady state (pressure and temperature) operational condition removes heat from the liquid helium reservoir and radiation shield (for two stage systems) at a constant rate to keep gas recondencing and therefore maintaining the liquid helium at a saturated condition. Typical cryocooler selection and use is driven by the maximum cooling capacity of the component at given temperature that is achieved thru an optimal constant oscillating frequency of the gas flow (thru constant cryocooler displacer/piston strokes frequency). High oscillation rates designed for maximum cooling capacity increase wear on the sealing components of the cryocooler leading to a reduction in component life. Magnets manufacturing component variations and component cool down (transients) demands high heat load removal by the cooler (maximum cooling capacity operational condition) but as the system (environment, radiation shield, cryocooler and cryogen reservoir) achieves steady state, the cooling capacity requirements are reduced. Since the cooling capacity of the cryocooler can not be change, the excess cryocooler cooling capacity is balanced by additional heat provided by electric heaters in the cryogen pressure vessel which is activate by low and high setting pressure limits creating pressure oscillation in the pressure vessel.

Large pressure variation in the cryogen pressure vessel can produce oscillating stresses in the superconducting magnet coils affecting the homogeneity of the magnetic field and therefore affecting image quality for MRI superconducting magnets. The invention will provide a more stable pressure environment for superconducting MRI magnet systems.

For the reasons stated above, and for other reasons stated below which will become apparent to those skilled in the art upon reading and understanding the present specification, there is a need in the art for variable heat load capacity cryocooler. There is also a need for an improved method and apparatus for controlling a cryocooler in a zero boiloff cryogen cooled recondensing superconducting magnet assembly including superconducting magnet coils suitable for magnetic resonance imaging.

BRIEF DESCRIPTION OF THE INVENTION

The above-mentioned shortcomings, disadvantages and problems are addressed herein, which will be understood by reading and studying the following specification.

It is therefore an object of the present invention to provide an apparatus and method for active adjustment of the cryocooler stroke displacer/piston frequency (oscillating frequency of the gas flow) to meet the variable cooling requirements of a superconducting magnet.

In one aspect, an apparatus for adjusting the cryocooler displacer/piston stroke rate of an alternate current induction or direct current electric motor driven cryocooler is described by first setting the motor for an initial stroke frequency. A proportional integral derivative (PID) controller determines an adjustment to the initial electric motor rate to adjust stroke rate, from the difference in actual pressure (liquid saturated conditions) in the liquid cryogen reservoir from a predetermined set pressure. A variable rate module is then employed to either increase or decrease the stroke frequency based on the adjustment by the PID controller.

In another aspect, an apparatus for adjusting the cryocooler displacer/piston stroke frequency driven by a constant speed electric motor with a variable mechanical transmission ratio such as a clutch or gear box for adjusting the cryocooler displacer/piston frequency is described by first setting an initial stroke rate for the cryocooler based on a given electric motor speed and mechanical transmission ratio. A proportional integral derivative (PID) controller determines an adjustment for initial stroke frequency from the difference in actual pressure (liquid saturated conditions) in the liquid cryogen reservoir from a predetermined set pressure. A transfer function between the stroke frequency and mechanical transmission ratio is used to determine the transmission ratio adjustment. Changes in mechanical transmission ratio for such devices as a clutch or gear is then employed to either increase or decrease the stroke frequency based on the adjustment by the PID controller.

In yet another embodiment, a variable cooling capacity cryocooler in a zero boiloff cryogen cooled recondensing superconducting magnet assembly including superconducting magnet coils suitable for magnetic resonance imaging is described with a closed vacuum vessel to contain a pressure vessel o liquid cryogen reservoir to provide cryogenic temperatures to the magnet coils for superconducting operation, a radiation shield (provides heat penetration reduction from the environment reducing cryogen liquid evaporation) surrounding the pressure vessel and spaced from the cryogen pressure vessel, a variable cooling capacity cryocooler with heat exchanger capable of removing heat at a first rate from the cryogen pressure vessel resulting from the provided cryogenic temperature to the magnet coils, and a pressure sensor positioned at the cryogen pressure vessel for sensing pressure variations. A controller unit for controlling the heat removal rate of the cryocooler based on the pressure in cryogen reservoir value (saturated condition) and where the heat removal rate variations of the cryocooler are proportional to the pressure variation. In the embodiment, the cryocooler heat removal rate is proportional to the pulse frequency of the displacer stroke (for GM and Stirling cryocoolers) and in general to the oscillating frequency of the gas flow in the cryocoolers (applicable to other coolers like Pulse Tube Technology).

In still another aspect, a method for controlling the liquid cryogen reservoir heat load of a cryostat for a zero boiloff cryogen cooled recondensing superconducting magnet assembly including superconducting magnet coils suitable for magnetic resonance imaging described performing the actions of removing heat by a cryocooler (single or dual stage) from the cryostat at a first heat removal rate, determining a pressure signal indicative of the pressure within the cryogen pressure vessel, calculating a pressure difference signal indicative of a difference between the determined pressure signal and a set pressure signal, calculating an adjustment to the first heat removal rate based on the calculated pressure difference, combining the first heat removal rate with the calculated adjustment to produced an adjusted heat removal rate, removing heat from the cryostat at the adjusted heat removal rate, and determining a pressure signal indicative of the pressure within the cryogen pressure vessel. The method also includes the ability to add heat to the liquid cryogen reservoir using electric heaters for small system tuning or in the event where the determined pressure is below a predetermined value (typically the atmospheric pressure).

Apparatus, systems, and methods of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, apparatus of embodiments are described. In the third section, a hardware and the operating environment in conjunction with which embodiments may be practiced are described. In the fourth section, methods of embodiments are described. Finally, in the fifth section, a conclusion of the detailed description is provided.

System Level Overview

Figure 1:
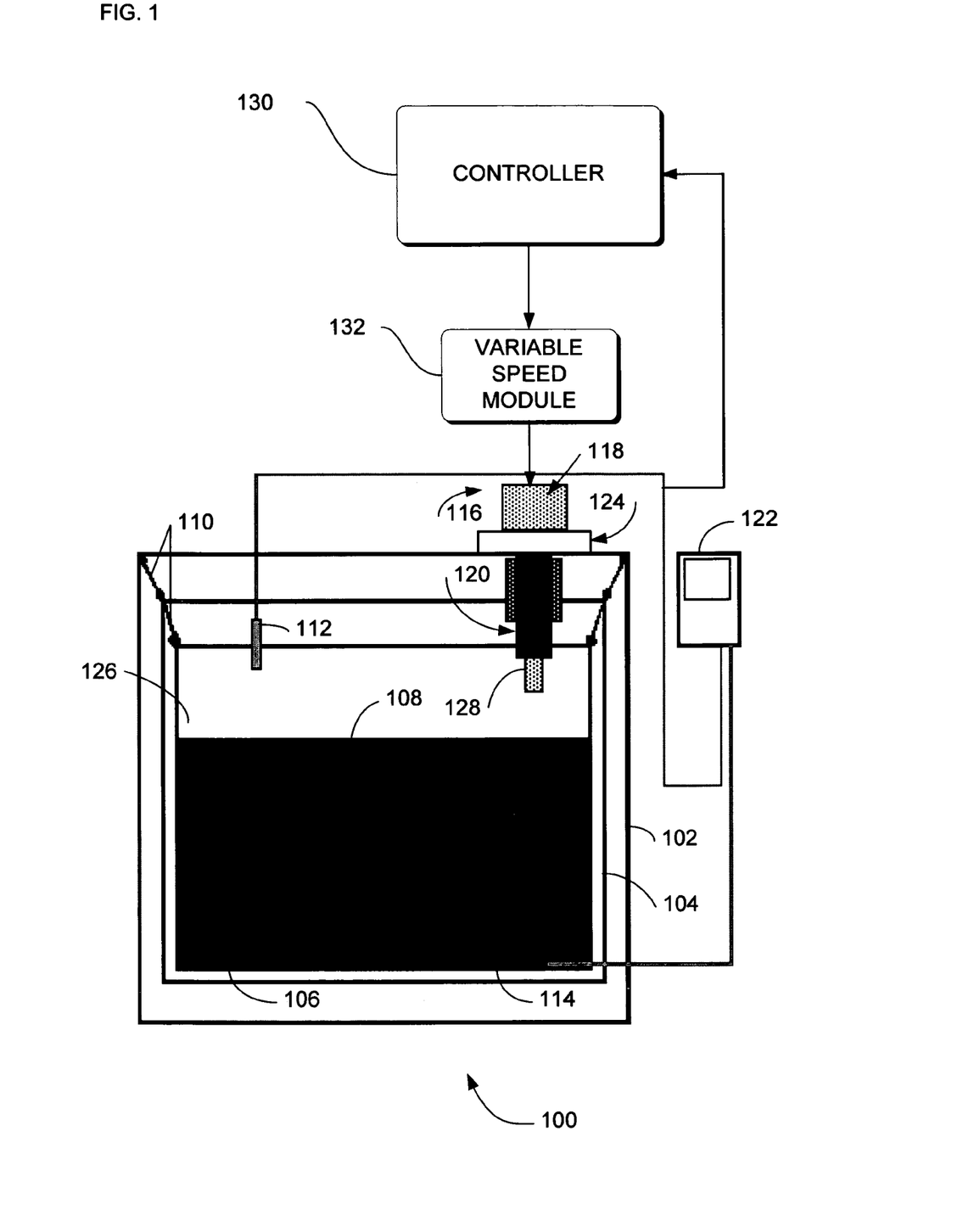
FIG. 1 is a diagram illustrating a system-level overview of an embodiment for controlling a cryocooler.

Referring first to FIG. 1, MRI zero boil-off superconducting magnet system 100 includes helium pressure vessel 106 including a liquid cryogen such as helium surrounded by vacuum vessel or cryostat 102 with thermally isolating radiation shield 104 interposed between the helium vessel and the vacuum vessel or cryostat 102. A cryocooler 116 (which may be a Stirling, Gifford-McMahon ("GM") and Pulse Tube ("PT") cryocooler) extends through vacuum vessel 102 within sleeve 124 such that the cold end of the cryocooler may be selectively positioned within the sleeve without destroying the vacuum within vacuum vessel 102, and heat generated by the motor or power drive 118 of the cryocooler is outside the vacuum vessel. External cryocooler sleeve ring (not shown) extends outside vacuum vessel 102 and other hardware enable the securing of outer cryocooler sleeve to vacuum vessel or cryostat 102. Cryocooler 116 is installed in a sleeve assembly (not shown) and secured with bolts and associated washers. The upper submerge part 120 of cryocooler (cryocooler first stage) 116 is usually copper a first stage thermal sleeve or heat sink which is thermally connected through braided copper flexible thermal couplings and copper thermal blocks on isolating radiation shield 104 to cool the radiation shield within temperature range 40 to 70 K. This provides thermal isolation between helium vessel 106 and vacuum vessel 102. Suspension components 110 also provide mechanical and vibration isolation between cryocooler 116 and radiation shield 104. The lower submerge part of cryocooler (cryocooler second stage) 116 include indium gasket to provide a temperature barrier to heat sinks positioned on the opposite side of the indium gasket.

Extending below is helium recondensing chamber 128, made of high thermal conductivity material such as copper, which includes a plurality of parallel heat transfer plates or surfaces in thermal contact with heat sink and forming passages between the surfaces of the plates for the passage of helium gas from helium pressure vessel 106. Helium gas 126 forms above liquid helium surface level 108 through the boiling of the liquid helium in providing cryogenic temperatures to the magnet coil system 100. Helium gas 126 passes through the wall of helium vessel 106, and through helium gas passage to the interior of the upper portion of helium recondensing chamber or canister 128. Heat transfer plates within recondenser 128 are cooled to a manageable temperature such that helium gas 126 passing between the plates recondenses into liquid helium to collect in a region of helium recondensing chamber 128, 120. The recondensed liquid helium then flows by gravity through helium return lines back to liquid helium in helium vessel 106. As a result, during operation of MRI magnet system, liquid helium 108 cools superconducting magnet coil assembly to a superconducting temperature in a manner well known in the MRI art, intrinsic radiation and conduction heat loads thru structural supports and flow lines result in boiling of helium liquid 108 and production of helium gas 126 above helium surface level 108. A ruthenium oxide cryogenic temperature sensor (not shown) is positioned on the surface of the recondenser system proximate the temperature barrier heat sink to sense the temperature of the recondenser system. The output signal of the sensor is processed by controller 122 to provide a control signal to electric strip heater 114, coupled to helium vessel 106, to insure tuning and system damping.

The cryocooler 118 of the preferred embodiment consists of at least one electric power drive (motor) to remove heat from the vacuum chamber 102. In the case of a pulse tube cryocooler valves body drives the compression and expansion helium gas pulse oscillation frequency of the cryocooler. Notwithstanding, the type of cryocooler 118 used by the MRI magnet system 100, the primary function is to remove heat from the helium pressure vessel 106 and shield 104 so as to maintain the MRI magnetic system within an acceptable temperature and pressure range. The heat load capacity of the cryocooler 116 will vary with the pulse frequency having the highest capacity at the maximum frequency. The current zero boil-off system is based on a cryocooler 116 designed with excess of cooling capacity to overcome variable heat load conditions due to component manufacturing process variations, performance degradation due to component orientation and to be able to satisfy heat loads requirement at the end of the component life. Typical GM cryocoolers 116 during normal operation removes heat from the liquid helium reservoir at constant rate (1.2 W at 4.2K) keeping the liquid helium at saturated condition. Since the intrinsic load to the helium vessel 106 is on the average 0.75 W, there is excessive cooling capacity by the cryocooler, requiring additional heat inputs in order to balance the energy in-out of the system avoiding non desirable internal condition for the pressure vessel 102 (saturated pressure below atmospheric pressure). In fact in current systems, additional heaters are employed periodically adding heat to the system in order to compensate for the excess cooling capacity of the cryocooler and on occasion to maintain the saturated pressure on the system above atmospheric pressure. The operation of the cryocooler at constant top cooling capacity reduces the component life expectancy of the cryocooler specially the sealing components.

What is needed is a regulator for keeping the cooling capacity of the cryocooler in line or tuned with the requirements or need of the heat load on the helium vessel. In some embodiments, the cooling capacity is reduced by using a lower cooling capacity cryocooler that is more in line with the heat requirement on the helium reservoir 106, but impacting end of life component performance. Method of achieving a variable cooling capacity cryocooler is described in this document by adding mechanical retardant such as gears and friction clutches between the input electric power drive and cryocooler moving parts (displacer/piston), making the constant speed of the power drive variable at the cryocooler end providing a variable stroke frequency and therefore variable cooling capacity. Other methods include the use of electric power drives (AC induction, DC stepping motor) with variable output speed linked directly to the cryocooler moving parts. The MRI magnetic system 100 solves the need in the art for variable heat load capacity cryocooler.

The MRI magnetic system 100 includes a pressure sensor 112 that is used by a pressure controller 122 and by a controller 130 to regulate the pulse frequency or stroke rate of a cryocooler 116 by using a variable speed module 132.

Apparatus

Figure 2:
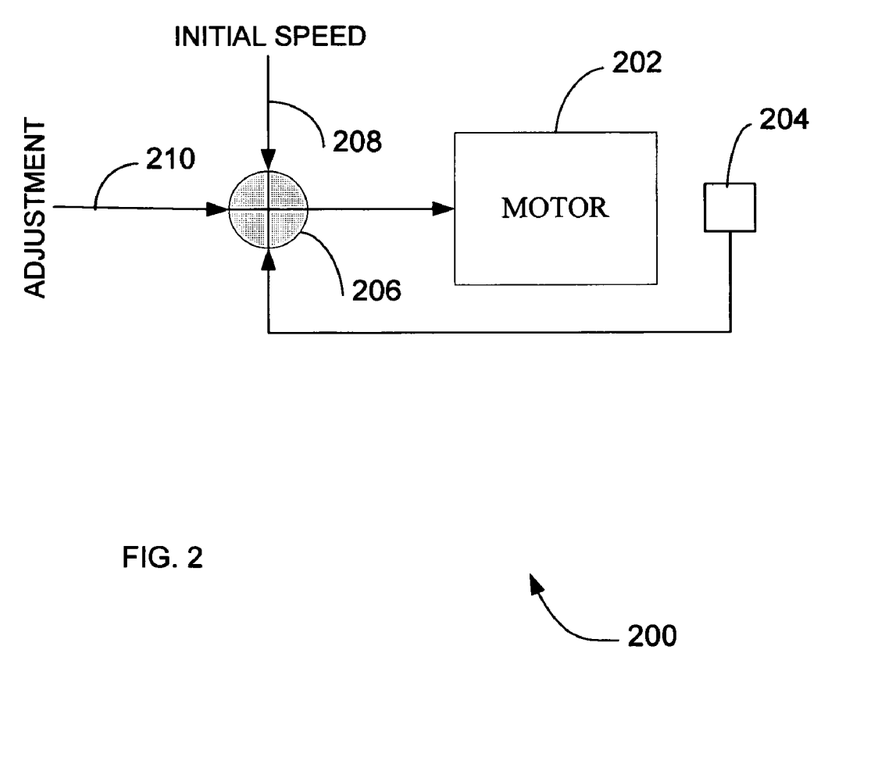
FIG. 2 is a diagram of apparatus, according to an embodiment for regulating an electric motor (Alternate current induction or direct current) of a cryocooler.

Variable speed module 132 is more fully described by system 200 of FIG. 2. As used herein the variable speed module 132 includes any known or later developed circuits or modules that can regulate the stroke frequency, stroke rate, or speed of a moving member such as a motor. Electric power drive 202 is provided with a speed measuring device 204 that is mounted adjacent rotating motor shaft (not shown). Device 204 is connected to a combiner 206 through an electrical conductor to provide a source of direct feedback of motor speed to regulate the speed of the motor when combined with an adjustment signal from controller 130. When the cryocooler is first a turned on an initial speed 208 is set for the electric power drive 202 and therefore to the cryocooler piston stroke frequency. In some embodiments, the initial speed is an arbitrary speed that fits within the cooling strategy for the system. For example, the initial speed is set at the maximum heat requirements for helium reservoir 106 (magnet cool down) or the initial speed set at half the nominal duty cycle of the electric power drive-cryocooler system and gradually brought up to the actual requirements of the helium reservoir 106. In some embodiments, since the time constant for the power drive 202 to reach a steady state or to achieve initial speed is small compared to the time constant for the system to reach thermal equilibrium, the initial speed signal can be set to zero and the speed is regulated by the control signal 210 and the speed measuring device signal from device 204. In the alternative, the speed measuring device 204 is removed and the speed regulating signals are a combination of the initial speed signal 208 and the adjustment signal 210 from the controller. In some embodiments, only the initial speed signal 208 and the adjustment signal 210 are used to regulate the speed of the electric power drive.

Figure 3:
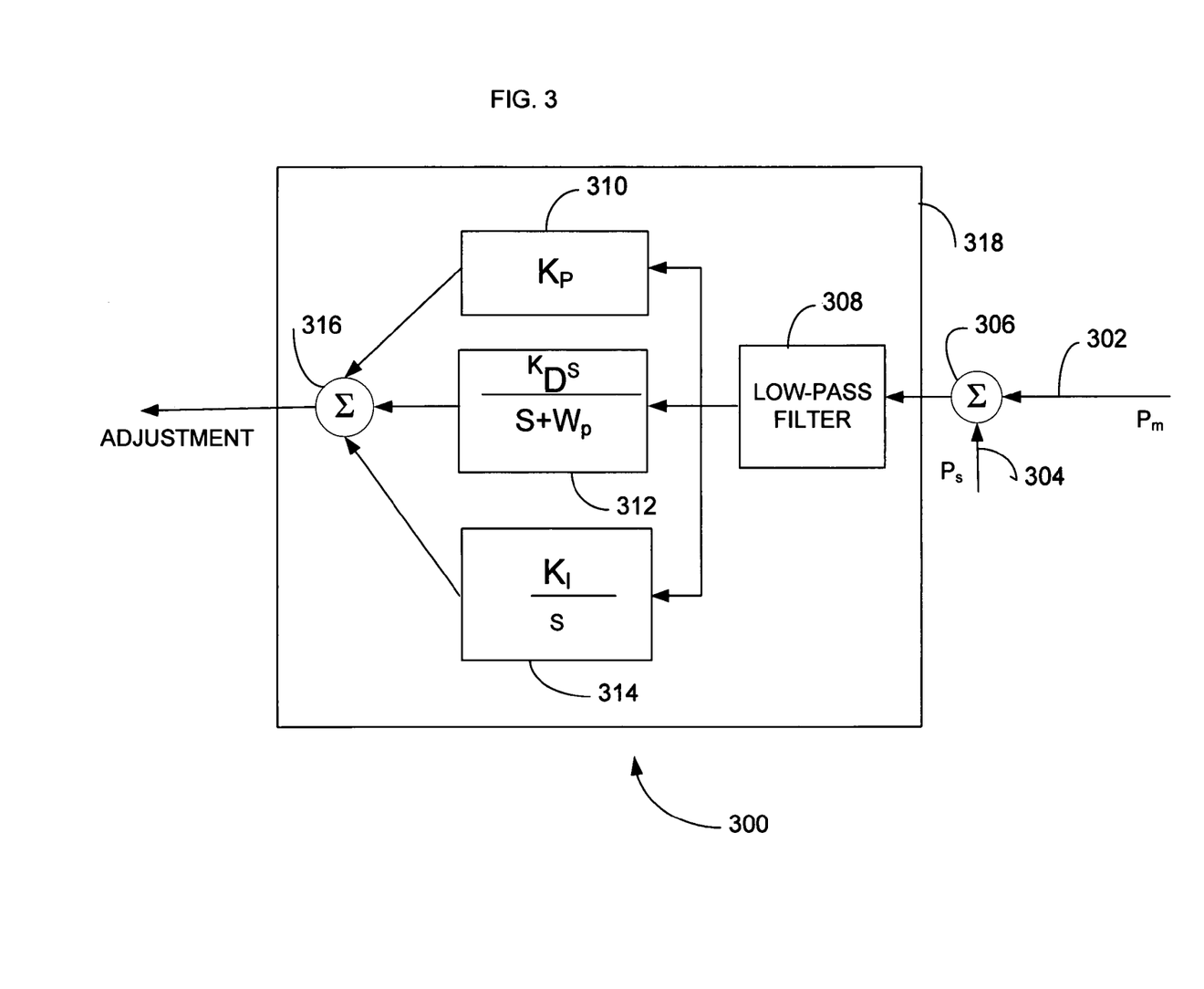
FIG. 3 is a diagram of a proportional integral derivative (PID) controller used to calculate an adjustment for optimizing the operation of the cryocooler.

The controller for producing the adjustment signal used to regulate the speed or stroke rate of motor 202 is described with reference to system 300 at FIG. 3. System 300 continuously computes the pressure (saturated conditions) difference 306, which is the difference between a measured pressure 302 from pressure sensor 112 and a set pressure 304. The computed pressure difference is then filtered with a low-pass filter 308 to remove the high frequency noise present in the measured pressure signal 302. The filtered pressure difference is then applied to a proportional integral derivative (PID) controller module 318, in control system 300, described below, and processed to produce proportional signal component 310, integral signal component 312, and derivative signal component 314, in each cycle of the operation and in a manner well known in the art for control systems. In conventional digital controllers, the output is usually computed from the difference signal 316 at sampling time by an equation, representing a proportional integral derivative algorithm, containing three terms:

A. a proportional term, $K_p e_n$, where $K_p$ is a constant, the proportional gain element;

B. a difference or derivative term, $K_D (e_n - e_{n-1}) T$, where $K_D$ is a constant, the derivative time, and T is the sampling period;

C. a summation or integral term can be accomplished by using well known numerical integration techniques such as the rectangular integration having T as the sampling period.

The output of the PID controller module 318 is the sum of the values of these three terms, after multiplication of the derivative term with a derivative gain $K_D$, and multiplication of the integral term with an integral gain $K_I$. The proper parameter values of sampling period T and proportional, derivative and integral gains $K_p$, $K_D$ and $K_I$ depend upon the process being controlled, and the adjustment of these constants to their proper values is accomplished by tuning.

Derivative compensation is used to accomplish short term system stability and the derivative term is produced by subtracting the pressure difference sample obtained in the previous iteration from the current pressure difference. Integral compensation is used to accomplish long term system stability, by reduction of the pressure difference to zero. Integration is accomplished by accumulating several error samples over time and multiplying their sum by an integral gain.

The required stroke rate or frequency adjustment 210 is computed in the PID controller module 318 as a summation of three signals: a proportional signal component 310 which is proportional to the filtered pressure difference, a derivative signal component 312, proportional to the derivative of the filtered pressure difference for short term stability, and an integral signal component 314, proportional to the integral of the filtered pressure difference, for long term stability. The sum of the three PID terms could be further passed through a low-pass filter. The constant parameters used in the derivative signal, proportional signal, and integral signal are specifically tuned for each individual cryocooler in order to satisfy the desired settling time and cooling capacity accuracy requirements.

Hardware and Operating Environment

Figure 4:
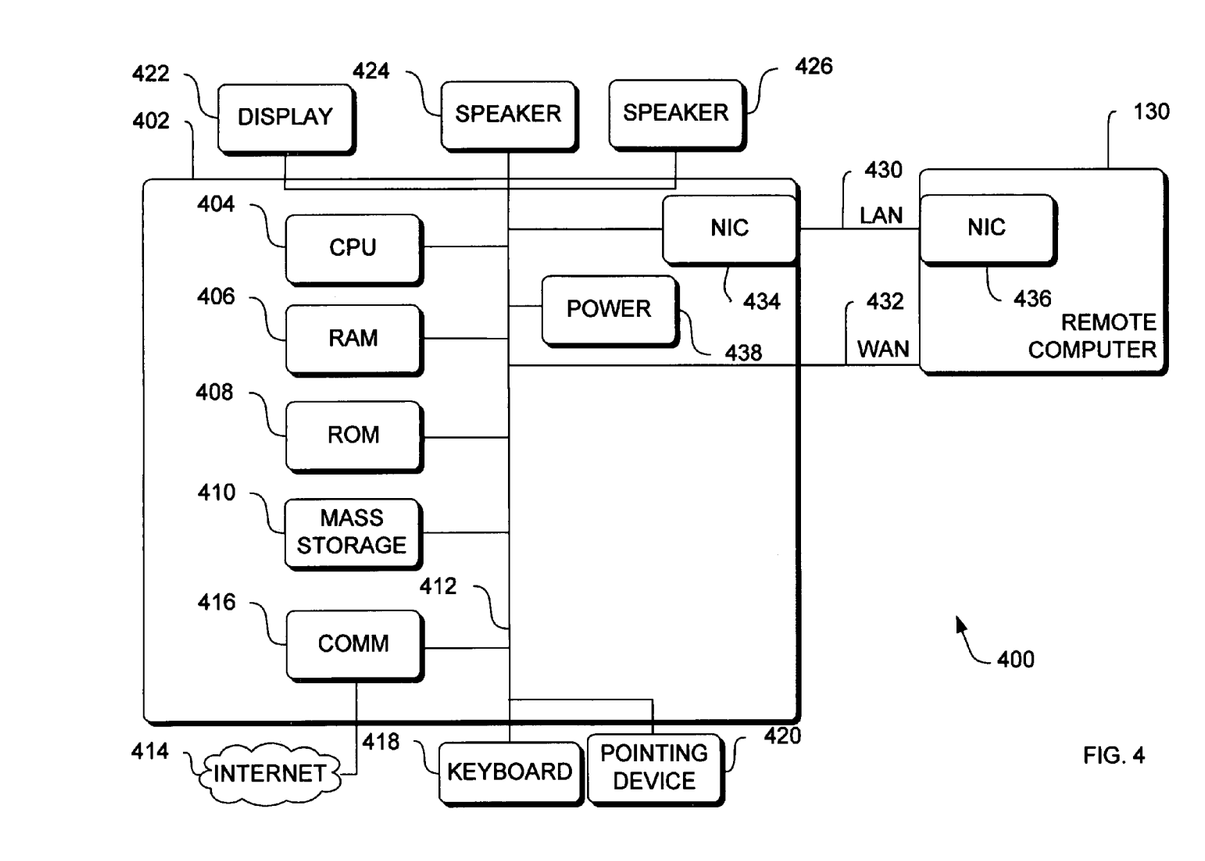
FIG. 4 is a block diagram of the hardware and operating environment in which different embodiments can be practiced.

FIG. 4 is a block diagram of the hardware and operating environment 400 in which different embodiments can be practiced. The description of FIG. 4 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 402 includes a processor 404, commercially available from Intel, Motorola, Cyrix and others. Computer 402 also includes random-access memory (RAM) 406, read-only memory (ROM) 408, and one or more mass storage devices 410, and a system bus 412, that operatively couples various system components to the processing unit 404. The memory 406, 408, and mass storage devices, 410, are types of computer-accessible media. Mass storage devices 410 are more specifically types of nonvolatile computer-accessible media and can include one or more hard disk drives, floppy disk drives, optical disk drives, and tape cartridge drives. The processor 404 executes computer programs stored on the computer-accessible media.

Computer 402 can be communicatively connected to the Internet 414 via a communication device 416 that allows remote system monitoring, troubleshooting and software reconfiguring. Internet 414 connectivity is well known within the art. In one embodiment, a communication device 416 is a modem that responds to communication drivers to connect to the Internet via what is known in the art as a "dial-up connection." In another embodiment, a communication device 416 is an Ethernet® or similar hardware network card connected to a local-area network (LAN) that itself is connected to the Internet via what is known in the art as a "direct connection" (e.g., T1 line, etc.).

A user enters commands and information into the computer 402 through input devices such as a keyboard 418 or a pointing device 420. The keyboard 418 permits entry of textual information into computer 402, as known within the art, and embodiments are not limited to any particular type of keyboard. Pointing device 420 permits the control of the screen pointer provided by a graphical user interface (GUI) of operating systems such as versions of Microsoft Windows®. Embodiments are not limited to any particular pointing device 420. Such pointing devices include mice, touch pads, trackballs, remote controls and point sticks. Other input devices (not shown) can include a micro phone, joystick, game pad, satellite dish, scanner, or the like.

In some embodiments, computer 402 is operatively coupled to a display device 422. Display device 422 is connected to the system bus 412. Display device 422 permits the display of information, including computer, video and other information, for viewing by a user of the computer. Embodiments are not limited to any particular display device 422. Such display devices include cathode ray tube (CRT) displays (monitors), as well as flat panel displays such as liquid crystal displays (LCD's). In addition to a monitor, computers typically include other peripheral input/output devices such as printers (not shown). Speakers 424 and 426 provide audio output of signals. Speakers 424 and 426 are also connected to the system bus 412.

Computer 402 also includes an operating system (not shown) that is stored on the computer-accessible media RAM 406, ROM 408, and mass storage device 410, and is and executed by the processor 404. Examples of operating systems include Microsoft Windows®, Apple MacOS®, Linux®, UNIX®. Examples are not limited to any particular operating system, however, and the construction and use of such operating systems are well known within the art.

Embodiments of computer 402 are not limited to any type of computer 402. In varying embodiments, computer 402 comprises a PC-compatible computer, a MacOS®-compatible computer, a Linux®-compatible computer, or a UNIX®-compatible computer. The construction and operation of such computers are well known within the art.

Computer 402 can be operated using at least one operating system to provide a graphical user interface (GUI) including a user-controllable pointer. Computer 402 can have at least one web browser application program executing within at least one operating system, to permit users of computer 402 to access intranet or Internet world-wide-web pages as addressed by Universal Resource Locator (URL) addresses. Examples of browser application programs include Netscape Navigator® and Microsoft Internet Explorer®.

The computer 402 can operate in a networked environment using logical connections to one or more remote computers, such as remote computer 130. These logical connections are achieved by a communication device coupled to, or a part of, the computer 402. Embodiments are not limited to a particular type of communications device. The remote computer 130 can be another computer, a server, a controller, a network PC, a PID controller, a router, a client, a peer device or other common network node. The logical connections depicted in FIG. 4 include a local-area network (LAN) 430 and a wide-area network (WAN) 432. Such networking environments are commonplace in offices, enterprise-wide computer networks, intranets and the Internet.

When used in a LAN-networking environment, the computer 402 and remote computer 130 are connected to the local network 430 through network interfaces or adapters 434, which is one type of communications device 416. Remote computer 130 also includes a network device 436. When used in a conventional WAN-networking environment, the computer 402 and remote computer 130 communicate with a WAN 432 through modems (not shown). The modem, which can be internal or external, is connected to the system bus 412. In a networked environment, program modules depicted relative to the computer 402, or portions thereof, can be stored in the remote computer 130.

Computer 402 also includes power supply 438. Each power supply can be a battery.

Methods of an Embodiment

In the previous section, apparatus of the operation of an embodiment was described. In this section, the particular methods performed by controller 130 or computer 402 of such an embodiment are described by reference to a series of flowcharts.

Figure 5:
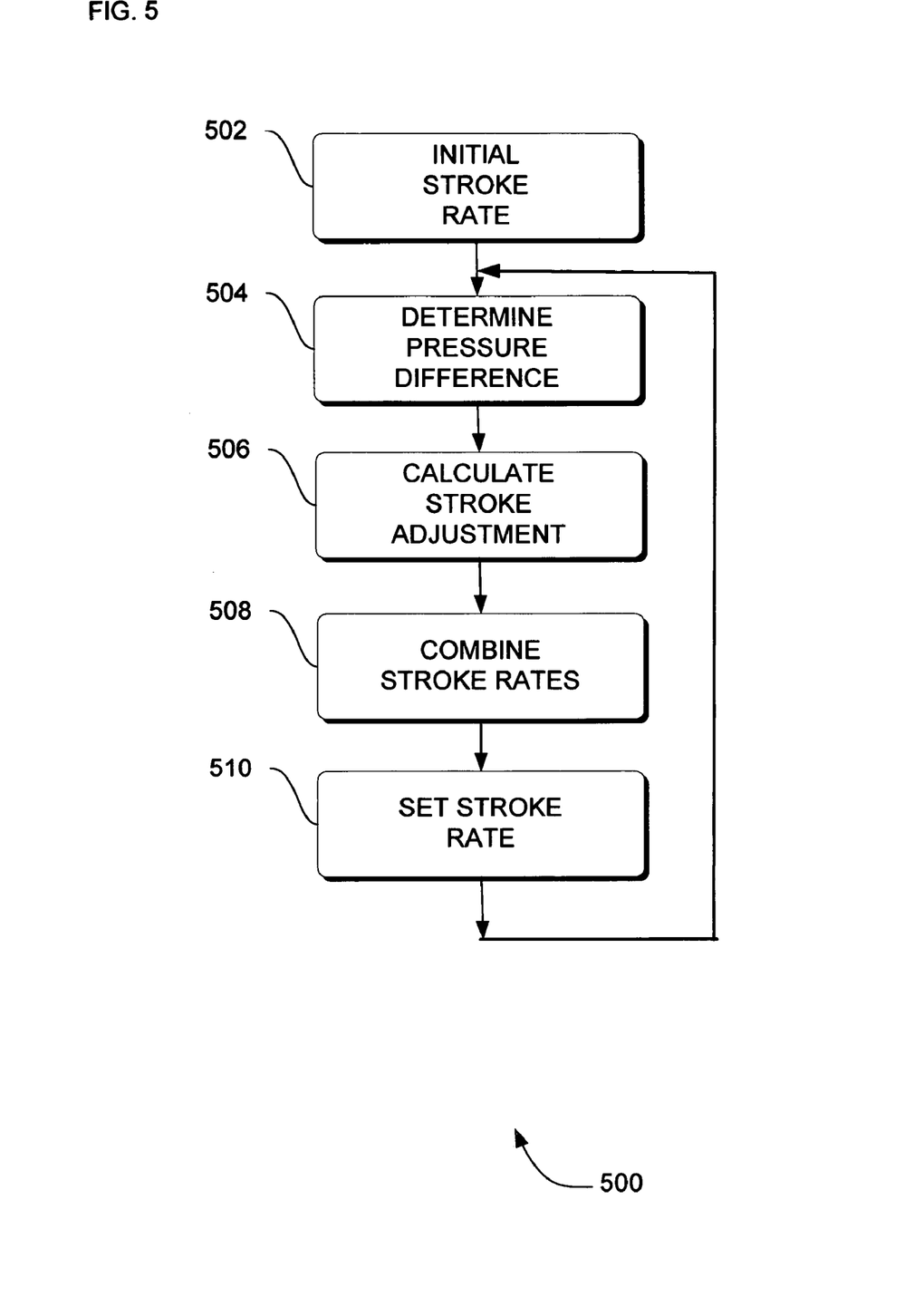
FIG. 5 is a diagram of flowchart for monitoring pressure and calculating an adjustment to optimize the operation of the cryocooler.

FIG. 5 is a flowchart of a method 500 according to an embodiment. Method 500 solves the need in the art for a variable cooling capacity cryocooler.

Method 500 begins with action 502. In action 502 an initial stroke rate or frequency is set for the electric power drive that drives the cryocooler displacer/piston that in turn determines the cooling capacity of the cryocooler. As noted earlier, conventional cryocoolers are set at a stroke frequency that maximizes the cooling capacity of the cryocooler. This maximum stroke rate reduces the life expectancy of moving components such as seals and component with dynamic contact surfaces in the cryocooler. The initial stroke frequency can be set to an arbitrary stroke rate such as the maximum requirement or to an arbitrary lower requirement. Further, prior cooling capacity demands on the cryocooler that can be based on statistics on prior equipment usage, the type of usage for the MRI magnetic system 100, the usage at the institution, or any other information that may facilitate an initial stroke rate or frequency determination. For the preferred embodiment the initial stroke rate is set at 0.68 of nominal duty cycle or at sixty eight percent (68%) of the maximum cooling capacity of the cryocooler. After, the initial stroke rate is set control passes to action 504 for further processing.

In action 504 a pressure difference is determined. The pressure difference is determined by measuring the pressure of the system 100 by use of a pressure transducer (absolute or gage transducer) as shown in FIG. 1 and subtracting an operational pressure or a set pressure. The set pressure is an arbitrary pressure that can be set based on prior equipment usage, the type of usage for the MRI magnetic system 100, the usage at the institution, or any other information that may facilitate optimal usage. The set pressure is dynamically selected based on the cooling capacity required from the cryocooler 116 to keep the cryostat 102 at its optimal operating condition. Once the pressure difference has been determined in action 504 control passes to action 506 for further processing.

In action 506 a stroke frequency adjustment is determined. Action 506 determines stroke rate adjustment by a careful application of a proportionality, integral, and derivative construct that defines the pressure variation in the cryostat 102. The proportionality represents the amount the pressure variable (PV) or set point (SP) must change to cause the output to change by a certain percentage. The essential operation of the proportionality component is to take an offset (difference in pressure) and reset the output (change the stroke rate of the motor) to a value that will eliminate the offset. The integral component is a sample and hold function that essentially represents the number of times, per minute, the integral term repeats the action of the proportional term. The derivative action is proportional to the rate of change of the pressure variable. Differentiation is designed to stop the pressure variable from changing and maintain the pressure on the set value. The overall effect of the PID controller is to counter balance the disturbance initially causing the process to move away from the desired set value. The controller then adjusts the stroke rate so that the cryocooler meets the heat load requirements of the system and slowly moves back to the set value. In other words the impact that the disturbance has on the closed loop system is eliminated and the system returns to the desired value. Once the adjustment is calculated at action 506 control passes to action 508 for further processing.

In action 508, the initial stroke rate is combined with the adjustment calculated in action 508. The combination has the overall effect that if the pressure is above the desired operating pressure, the combination will increase the cryocooler's 116 stroke frequency or pulse rate to increase the cooling capacity of cryocooler 116. In the alternative, a pressure below the desired operating pressure leads to a decrease in the stroke rate and a lowering of the cooling capacity of cryocooler 116. Thus, the cryocooler 116 is able to adapt to the existing heat load requirements of cryostat 102. Once the stroke speeds have been combined in action 508 control passes to action 510 for further processing.

In action 510, the stroke rate is set to the combined stroke rate in action 510. Once the stroke has been set control is transfer from action 510 to action 504 for further processing.

In some embodiments, methods 500 are implemented as a computer data signal embodied in a carrier wave, that represents a sequence of instructions which, when executed by a processor, such as processor 404 in FIG. 4, cause the processor to perform the respective method. In other embodiments, methods 500 are implemented as a computer-accessible medium having executable instructions capable of directing a processor, such as processor 404 in FIG. 4, to perform the respective method. In varying embodiments, the medium is a magnetic medium, an electronic medium, or an optical medium.

Figure 6:
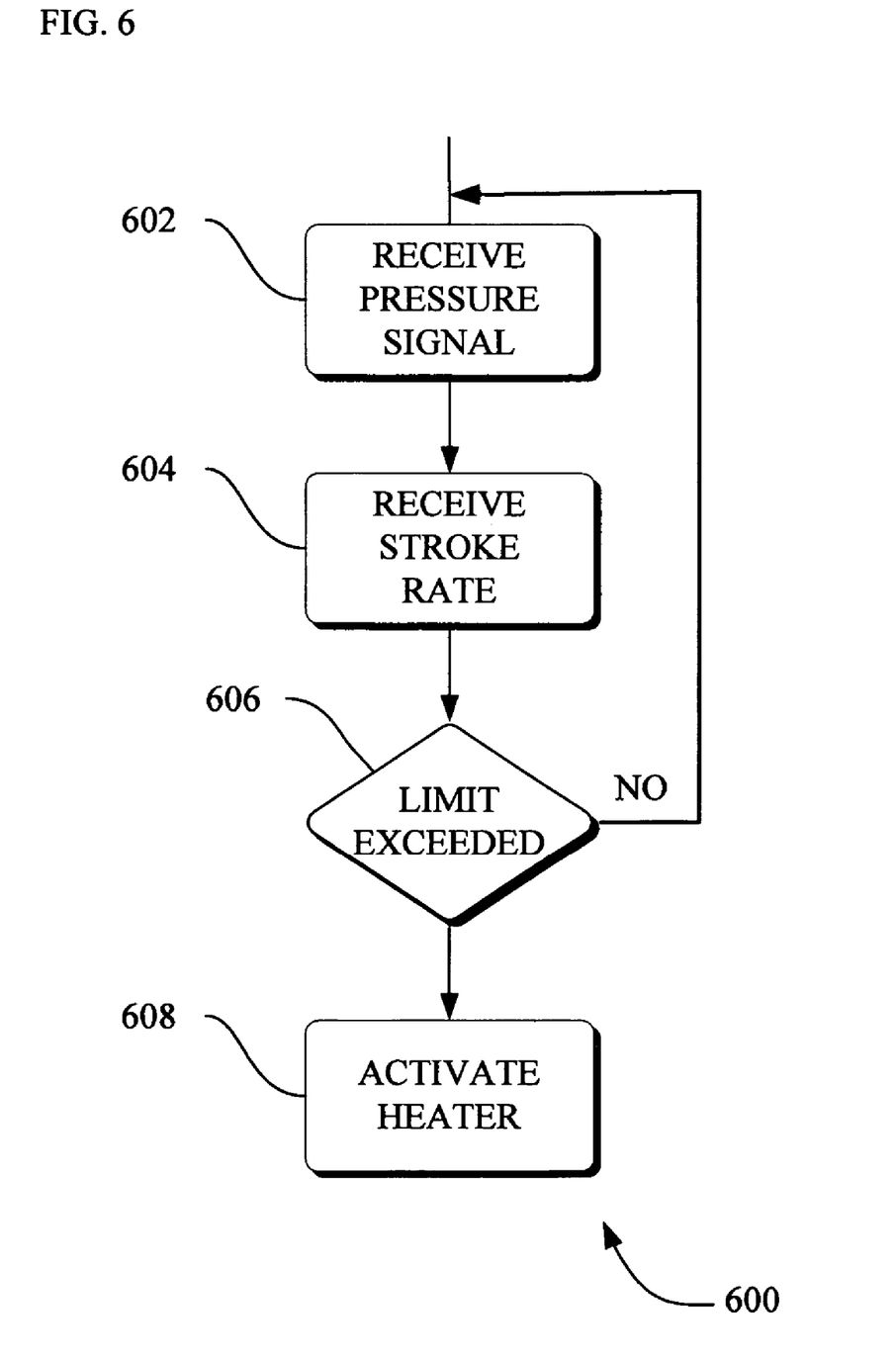
FIG. 6 is a diagram of flowchart for monitoring pressure and stroke rate of the cryocooler and for adding heat to a cryostat system when the monitored pressure falls below a predetermined value.

Method 600 begins with action 602. In action 602 a pressure signal is received by the data processing system from pressure sensor 112. It should be noted that while sensor 112 is a pressure sensor the pressure signal could be derived from temperature signals by used of well known relationships between temperature and pressure. Once the pressure signal has been received control passes to action 604 for further processing.

In action 604, the stroke frequency or stroke rate of the cryocooler compressor is determined. The stroke frequency is proportional and in the same direction to the cooling capacity to the heat removal rate of cryocooler 116. After the pressure is determined control passes to action 606 for further processing.

In action 606, exceedance of an operational limit is determined and compared to the received pressure signal and the received stroke frequency or stroke rate. Action 606 determines adjustments to the cryostat by a careful application of a proportionality, integral, and derivative construct that defines the pressure variation in the cryostat 102. The proportionality represents the amount the pressure variable (PV) or set point (SP) must change to cause the output to change by a certain percentage. The essential operation of the proportionality component is to take an offset (difference in pressure from an arbitrary point) and change the heat removal rate of the cryocooler 116 or engage heater 112 to a level that will eliminate the offset. The integral component is a sample and hold functions that essentially represents the number of times per minute the integral term repeats the action of the proportional term. The derivative action is proportional to the rate of change of the pressure variable. The derivative is designed to stop the pressure variable from changing and maintain the pressure on the set value. The overall effect of the PID controller is to counter balance the disturbance initially causing the process to move away from the desired set value. The controller then adjusts the heat removal rate so that the cryocooler 116 meets the heat load requirements of the system and slowly moves back to the set value. In other words the impact of the disturbance has on the closed loop system is eliminated and the system returns to the desired value. After a determination as to the exceedance of the pressure value control passes either to action 602 for receiving an updated pressure signal or to action 608 to add heat to the cryostat through heater 112.

In action 608, heat is added to the system to maintain the pressure of the system within a desired operating range. When the current pressure falls below atmospheric pressure control is passed to action 616 for further processing. Heater 114 of FIG. 1 has its own controller 122 as is well known in the art. The aim of action 608 is to compensate for excess cooling capacity of the cryocooler 116 and to maintain the pressure above atmospheric pressure. If the current pressure (action 602) does not exceed atmospheric pressure or is above atmospheric pressure the process continues is normal course of action.

CONCLUSION

A controller for a cryocooler has been described. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future controller devices, different cryocoolers, and new cryogens.

We claim:

1. An apparatus for adjusting stroke frequency of a cryocooler as a function of pressure in a cryogen pressure vessel, the apparatus comprising:
    a generator for setting an initial stroke rate for the cryocooler by setting alternating or direct current motor speed;
    a difference measuring device for continuously measuring in each cycle of operation a pressure difference between a measured pressure and a set pressure;
    a controller for calculating in each cycle of operation a required stroke rate or a frequency adjustment for the cryocooler from the measured pressure difference;
    a variable speed module for combining in each cycle of operation the stroke rate adjustment with the initial stroke rate to adjust the stroke rate or frequency by adjusting the alternating or direct current motor speed in order to optimize operations of the cryocooler; and
    a thermal gasket operably coupled between the cryocooler and a recondenser to provide a thermal interface, and pressure controller to selectively adjust a mechanical pressure across the thermal interface, a the pressure controller including a display to indicate a temperature drop across the thermal interface;
    wherein the variable speed module increases the cryocooler stroke rate by increasing the alternating or direct current motor speed when the measured pressure is greater than the set pressure.

2. The apparatus of claim 1, wherein the controller further comprises a proportional integral derivative controller that calculates the cryocooler stroke rate adjustment as a sum of a proportional signal component, a derivative signal component and an integral signal component of the measured pressure difference.

3. An apparatus for adjusting cryocooler stroke speed by adjusting mechanical transmission ratio between a constant speed electric power drive and a cryocooler displacer/piston as a function of pressure in cryogen pressure vessel, the apparatus comprising:
    a generator for setting an initial stroke speed for the cryocooler;
    a difference measuring device for continuously measuring in each cycle of operation, a pressure difference between a measured pressure and a set pressure; and
    a controller for calculating in each cycle of operation a required stroke rate adjustment and therefore the adjusted mechanical transmission ratio based on the measured pressure difference; and
    a thermal gasket operably coupled between the cryocooler and a recondenser to provide a thermal interface, and a pressure controller to selectively adjust a mechanical pressure across the thermal interface, the pressure controller including a display to indicate a temperature drop across the thermal interface;
    a mechanical transmission for changing the cryocooler stroke rate at each cycle of operation based on the stroke rate adjustment in order to optimize operations of the cryocooler.

4. The apparatus of claim 3, wherein the controller further comprises a proportional integral derivative controller that calculates the stroke speed adjustment as a sum of a proportional signal component, a derivative signal component and an integral signal component of the measured pressure difference.

5. The apparatus of claim 4, wherein the mechanical transmission applies a retardant force to lower the cryocooler stroke rate when the measured pressure is less than the set pressure.

6. A variable cooling capacity cryocooler in a zero boiloff cryogen cooled recondensing superconducting magnet assembly including superconducting magnet coils suitable for magnetic resonance imaging comprising:
    a cryogen pressure vessel to contain a liquid cryogen reservoir to provide cryogenic temperatures to the magnet coils for superconducting operation;
    a radiation shield surrounding the cryogen pressure vessel and spaced from the cryogen pressure vessel;
    a cryocooler for removing heat at a first rate from the cryogen pressure vessel resulting from the provided cryogenic temperature to the magnet coils;
    a pressure sensor positioned outside the cryogen pressure vessel for sensing pressure variations;
    a thermal gasket operably coupled between the cryocooler and a recondenser to provide a thermal interface, and a pressure controller to selectively adjust a mechanical pressure across the thermal interface, the pressure controller including a display to indicate a temperature drop across the thermal interface; and a controller for controlling the cryocooler cooling capacity based on the pressure variations;

wherein the heat removal rate of the cryocooler decreases with the internal gas flow oscillation frequency.

7. The variable cooling capacity cryocooler of claim 6, wherein the cryocooler heat removal rate is proportional to the cryocooler pulse frequency or stroke rate.

8. The variable cooling capacity cryocooler of claim 7, wherein the variable cooling capacity cryocooler further comprises:

a variable pulse frequency module electrically coupled to the alternating or a direct current motor for regulating the pulse frequency of the alternating or direct current motor.

9. The variable cooling capacity cryocooler of claim 8, wherein the controller further comprises a proportional integral derivative controller that calculates a pulse frequency adjustment as a sum of a proportional signal component, a derivative signal component and an integral signal component of the sensed pressure variations.

10. The variable cooling capacity cryocooler of claim 9, wherein the variable heat load capacity cryocooler further comprises:

a combiner for combining the pulse frequency adjustment with an initial pulse frequency that is proportional to the first rate of heat removal;

wherein the combiner is electrically coupled to the variable pulse frequency to control the cryocooler heat removal from the cryogen pressure vessel.

11. The variable heat load capacity cryocooler of claim 10, the variable cooling capacity cryocooler further comprising:

a recondenser; and a thermal interface between the cryocooler and the recondenser;

wherein a temperature sensor is positioned in the region proximate to the thermal interface.

12. The variable heat load capacity cryocooler of claim 11, the variable heat load capacity cryocooler further comprising:

an electrical heater in thermal contact with the recondenser and stably responsive to variations in the temperature of the recondenser as sensed by the temperature sensor.

13. The variable heat load capacity cryocooler of claim 12 wherein the thermal interface includes a heat sink and the temperature sensor is positioned on the recondenser proximate to the heat sink.

14. The variable heat load capacity cryocooler of claim 13 wherein the temperature sensor further comprises a ruthenium oxide cryogenic sensor.

15. The variable heat load capacity cryocooler of claim 14 wherein the thermal interface further comprises an indium gasket.

16. A method for controlling a cryocooler of a zero boiloff cryogen cooled recondensing superconducting magnet assembly including superconducting magnet coils suitable for magnetic resonance imaging comprising:

setting an initial stroke speed for an alternating current motor in the cryocooler;

continuously measuring in each cycle of operation a pressure difference between a measured pressure at a cryogen pressure vessel and a set pressure;

calculating in each cycle of operation a required stroke speed adjustment for the alternating current motor based on the measured pressure difference;

providing a thermal gasket operably coupled between the cryocooler and a recondenser to provide a thermal interface, and a pressure controller to selectively adjust a mechanical pressure across the thermal interface, the pressure controller including a display to indicate a temperature drop across the thermal interface;

combining in each cycle of operation each the stroke speed adjustment with the initial stroke speed of the alternating current motor; and adjusting the stroke speed of the alternating current motor based on the combined initial stroke speed and the adjusted stroke speed for the alternating current motor in order to optimize operations of the cryocooler.

17. The method of claim 16, wherein the calculated stroke speed adjustment further comprises a sum of a proportional signal component, a derivative signal component and an integral signal component of the measured pressure difference.

18. The method of claim 17, wherein the adjusting is performed by a variable speed module to changes the stroke rate by changing the speed of an alternating current motor.

19. A method for controlling a cryostat for a zero boiloff cryogen cooled recondensing superconducting magnet assembly including superconducting magnet coils suitable for magnetic resonance imaging comprising:

receiving a pressure signal indicative of the pressure within the cryostat, receiving a stroke frequency signal indicative of the pulse rate of a cryocooler coupled to the cryostat;

receiving a set pressure signal indicative of a selected operating pressure for the cryostat;

calculating a pressure difference signal indicative of a difference between the received pressure signal and the received set pressure signal;

controlling the cryostat when the calculated pressure difference pressure exceeds a predetermined value;

providing a thermal gasket operably coupled between the cryocooler and a recondenser to provide a thermal interface, and a pressure controller to selectively adjust a mechanical pressure across the thermal interface, the pressure controller including a display to indicate a temperature drop across the thermal interface; and wherein controlling the cryostat is one or more adding heat to the cryostat, adjusting the stroke frequency of the cryocooler, and adding heat and adjusting the stroke frequency of the cryocooler.

20. The method of claim 19, wherein the calculated adjustment further comprises a sum of a proportional signal component, a derivative signal component and an integral signal component of the determined pressure difference.

21. The method of claim 20, wherein adding heat is performed by a two stage cryostat.

22. The method of claim 21, wherein the cryocooler uses a variable speed module to adjust stroke frequency.

23. The method of claim 21, wherein heat is added by a heater element thermally coupled to the cryostat.

* * * * *